J. OLIVER.
MOLD-BOARD.
No. 6,897. Reissued Feb. 1, 1876.
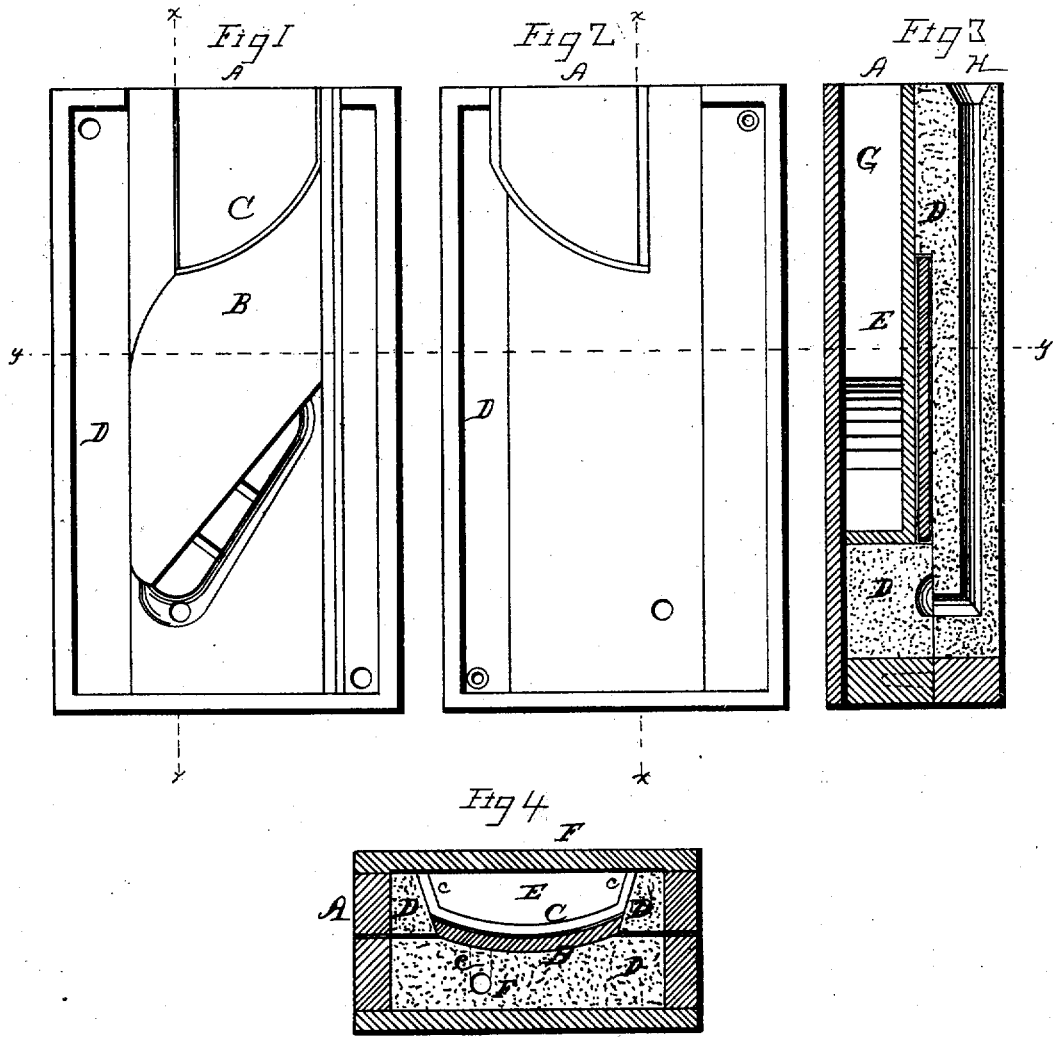
Witnesses.
Walter Miller
Wm. Ewart
Inventor.
James Oliver
By Leggett & Leggett
Attorneys
N. PETERS, PHOTO-LITHOGRAPHER, WASHINGTON, D. C.

UNITED STATES PATENT OFFICE.

JAMES OLIVER, OF SOUTH BEND, INDIANA.

IMPROVEMENT IN MOLD-BOARDS.

Specification forming part of Letters Patent No. 76,652, dated April 14, 1868; reissue No. 5,829, dated April 7, 1874; reissue No. 6,897, dated February 1, 1876; application filed August 14, 1875.

DIVISION B.

*To all whom it may concern:*

Be it known that I, JAMES OLIVER, of South Bend, county of St. Joseph, Indiana, have invented a new and useful Improvement in Chill Annealed Cast Mold-Boards for Plows; and I do hereby declare the following to be a full, clear, and exact description thereof, which will enable others skilled in the art to which my invention relates to make and use it, reference being had to the accompanying drawings, which form a part of this specification, in which—

Figure 1 represents one part of the open flask, with the pattern resting on the chill. Fig. 2 represents the other part of the flask, as seen when taken from the pattern, or when the parts of the flask are separated. Fig. 3 is a longitudinal section through lines *x x* of Figs. 1 and 2. Fig. 4 is a transverse section through lines *y y*.

A represents a flask, composed of two parts—the couple and drag. B represents the mold-board pattern, constructed to conform to the shape of the mold-board to be made. C represents the chill, the face of which is curved, to correspond to the shape of the face of the pattern. One end and the sides *c* of the said chill are turned up to form a water-chamber, E, of metal, which is closed by cover F, opposite to the chill, and the end G of the chamber is left open.

In casting, the pattern B is placed upon the chill C, the spaces D filled with sand, the pattern removed, and the sprue-hole H and gate *a* formed in any known or convenient manner. The chamber E is then filled with hot or boiling water, after which the molten metal is poured in through the sprue-hole H, and enters the space formed by the pattern through the gate *a*.

The sand in the flask is naturally damp, and the dampness coming in contact with the chill rusts the chill, and also condenses upon the face of the chill, so that, were the molten metal to come in contact with it while in this condition, the dampness would cause a flickering or disturbance of the molten metal, which, if cooled in this condition, would make a rough uneven surface on the face of the mold-board; and, further, were the chill cold in casting thin articles, like the mold-board, requiring a large chill-surface, the molten metal would commence to cool before it covered the entire surface of the chill, and make an imperfect casting. To remedy this I first fill the chamber, of which the chill forms a part, with hot or boiling water, which heats the chill and evaporates the dampness, so that, when the molten metal is poured in, there being no dampness, the metal flows easily and smoothly over the surface of the chill, which gives a smooth and even surface to the face of the mold-boards, which cannot be done by the old method of casting mold-boards. The water also assists in absorbing the heat from the molten iron, by keeping the chill comparatively cool, and thereby assists in hardening the casting.

After the mold-board has been thus cast, it is well known and understood that an iron chill, where there is much of a body of iron, does not harden or chill the casting entirely through or upon both sides. This fact, as well as the irregular shape of the casting, occasions unequal shrinkage, and the consequent strain, which is sufficient in many cases to destroy the casting by warping or cracking. Were the mold-boards left in the flask to cool, or taken therefrom and exposed to the atmosphere, a more or less number of them would be ruined, from the cause above mentioned.

To prevent damage, and to temper and toughen, and to consequently improve, the texture and quality of the iron, I place the mold-boards, while red hot, in an oven upon a bed of burning charcoal, or dry hot sand, omitting the charcoal. The mold-boards are placed in a pile on the bed of charcoal in convenient number, and the pile is covered with charcoal, and then the charcoal-covered pile is covered with dry hot sand, or dry hot sand may be used without the charcoal. From this pile the atmosphere is excluded by covering the oven with plates of iron, or otherwise, and luting the cracks or otherwise excluding the air. In this condition the mold-boards are left for twenty or thirty hours, more or less. The moderate heat to which the mold-boards are thus subjected does not soften the chilled surface, while the gradual cooling prevents all damages from unequal shrinkage. The result is an annealed chilled plow mold-board.

Having thus fully described my invention, I desire it to be understood that I do not here lay claim to the process described in the reissue Patent, Division A, of even date with this patent, nor to the mechanism by which that process is carried into effect, or by which this mold-board, herein described, is made; and I am aware that mold-boards have heretofore been cast between solid cold chills and then allowed to cool in the open air, thereby forming a brittle chilled mold-board; also, that mold-boards have been cast in highly-heated chills, and afterward reheated to a cherry-red heat, and then allowed to cool, thereby forming an unchilled and soft metal mold-board, and such an article I do not claim; but

What I claim is—

As a new article of manufacture, an annealed mold-board having a chilled outer or wearing surface, substantially as set forth.

JAMES OLIVER.

Witnesses:

W. G. GEORGE,

E. R. FARNAM.